(12) United States Patent
Brown et al.

(10) Patent No.: US 11,444,298 B2
(45) Date of Patent: Sep. 13, 2022

(54) ELECTROLYTE SHUNT MIGRATION MANAGEMENT IN A FUEL CELL STACK

(71) Applicant: DOOSAN FUEL CELL AMERICA, INC., South Windsor, CT (US)

(72) Inventors: Patrick Michael Brown, Enfield, CT (US); Ke Gong, Ellington, CT (US)

(73) Assignee: HYAXIOM, INC., East Hartford, CT (US)

( * ) Notice: Subject to any disclaimer, the term of this patent is extended or adjusted under 35 U.S.C. 154(b) by 551 days.

(21) Appl. No.: 16/515,426

(22) Filed: Jul. 18, 2019

(65) Prior Publication Data
US 2021/0020972 A1   Jan. 21, 2021

(51) Int. Cl.
| H01M 8/04276 | (2016.01) |
| H01M 8/0258 | (2016.01) |
| H01M 8/2465 | (2016.01) |
| H01M 8/0267 | (2016.01) |
| H01M 8/0289 | (2016.01) |
| H01M 8/24 | (2016.01) |

(52) U.S. Cl.
CPC ..... *H01M 8/04276* (2013.01); *H01M 8/0258* (2013.01); *H01M 8/0267* (2013.01); *H01M 8/0289* (2013.01); *H01M 8/2459* (2016.02); *H01M 8/2465* (2013.01)

(58) Field of Classification Search
CPC ........... H01M 8/04276; H01M 8/0258; H01M 8/0267; H01M 8/0289; H01M 8/2459; H01M 8/2465
See application file for complete search history.

(56) References Cited

U.S. PATENT DOCUMENTS

| 3,615,845 A | 10/1971 | Foster |
| 3,814,631 A | 6/1974 | Warszawski et al. |

(Continued)

FOREIGN PATENT DOCUMENTS

| JP | 53-030747 A | 3/1978 |
| JP | S62237671 A | 10/1987 |

(Continued)

OTHER PUBLICATIONS

International Search Report and Written Opinion for International Application No. PCT/US2020/040948 dated Oct. 13, 2020.

(Continued)

*Primary Examiner* — Cynthia H Kelly
*Assistant Examiner* — Jenna Shulman
(74) *Attorney, Agent, or Firm* — Carlson, Gaskey & Olds, P.C.

(57) ABSTRACT

An illustrative example fuel cell assembly includes a plurality of fuel cells arranged in a stack including a first end fuel cell near a first end of the stack and a second end fuel cell near a second end of the stack. Each of the fuel cells includes a matrix containing an electrolyte, an anode and a cathode on opposite sides of the matrix, and respective flow fields adjacent the anode and the cathode. An electrolyte supply associated with the anode flow field of the first end fuel cell includes a porous material containing electrolyte. An electrolyte collector associated with the cathode flow field of the second end fuel cell includes a porous material configured to collect electrolyte from at least the cathode of the second end fuel cell.

12 Claims, 2 Drawing Sheets

(56) References Cited

U.S. PATENT DOCUMENTS

| | | | |
|---|---|---|---|
| 3,905,832 | A | 9/1975 | Trocciola |
| 4,035,551 | A | 7/1977 | Grevstad |
| 4,185,145 | A | 1/1980 | Breault |
| 4,219,611 | A | 8/1980 | Breault |
| 4,366,211 | A | 12/1982 | Pollack |
| 4,383,008 | A | 5/1983 | Chi |
| 4,463,066 | A | 7/1984 | Adlhart et al. |
| 4,463,067 | A | 7/1984 | Feigenbaum |
| 4,463,068 | A | 7/1984 | Cohn et al. |
| 4,467,019 | A | 8/1984 | Feigenbaum |
| 4,732,822 | A | 3/1988 | Wright et al. |
| 4,766,043 | A | 8/1988 | Shirogami et al. |
| 4,980,247 | A | 12/1990 | Nakajima |
| 9,812,724 | B2 | 11/2017 | Kanuri et al. |
| 9,923,218 | B2 | 3/2018 | Arpin et al. |
| 2013/0059222 | A1* | 3/2013 | Thomas ............... H01M 8/08 429/458 |
| 2018/0375118 | A1* | 12/2018 | Patterson, Jr. ...... H01M 8/0293 |
| 2019/0165401 | A1* | 5/2019 | Patterson, Jr. ...... H01M 8/0267 |

FOREIGN PATENT DOCUMENTS

| | | |
|---|---|---|
| JP | 10-021948 A | 1/1998 |
| JP | 2006-092763 A | 4/2006 |
| JP | 2017-084633 A | 5/2017 |
| JP | 2017-0199546 | 11/2017 |

OTHER PUBLICATIONS

International Preliminary Report on Patentabilty for International Application No. PCT/US2020/040948 dated Jan. 27, 2022.

\* cited by examiner

ELECTROLYTE SHUNT MIGRATION MANAGEMENT IN A FUEL CELL STACK

BACKGROUND

Fuel cells generate electricity based on an electrochemical reaction between reactants such as hydrogen and oxygen. Fuel cell devices include a number of fuel cells in a cell stack assembly. One issue associated with liquid electrolyte fuel cells is managing the electrolyte within the cell stack assembly. Maintaining adequate electrolyte throughout the stack and preventing flooding of any cells within the stack are important to keeping the cell stack assembly operational.

Another issue involved in fuel cell operation is maintaining desired operating temperatures. Cell stack assemblies typically include coolers at various locations within the stack to prevent cells from overheating. The typical distribution of such coolers leaves some cells further from them and subject to higher temperatures, which can lead to drying out such cells more quickly than those that are closer to a cooler.

SUMMARY

An illustrative example fuel cell assembly includes a plurality of fuel cells arranged in a stack including a first end fuel cell near a first end of the stack and a second end fuel cell near a second end of the stack. Each of the fuel cells includes a matrix containing an electrolyte, an anode and a cathode on opposite sides of the matrix, and respective flow fields adjacent the anode and the cathode. An electrolyte supply associated with the anode flow field of the first end fuel cell includes a porous material containing electrolyte that can be supplied to at least the anode of the first end fuel cell. An electrolyte collector associated with the cathode flow field of the second end fuel cell includes a porous material configured to collect electrolyte from at least the cathode of the second end fuel cell.

An example embodiment having one or more features of the assembly of the previous paragraph includes a first cooler adjacent the first end fuel cell and a second cooler adjacent the second end fuel cell. The first cooler includes the anode flow field of the first end fuel cell and the electrolyte supply and the second cooler includes the cathode flow field of the second end fuel cell and the electrolyte collector.

In an example embodiment having one or more features of the assembly of any of the previous paragraphs, the electrolyte supply comprises a first plate of the porous material, the first plate is supported on a side of the first cooler facing the anode of the first end fuel cell, the electrolyte collector comprises a second plate of the porous material, and the second plate is supported on a side of the second cooler facing the cathode of the second end fuel cell.

In an example embodiment having one or more features of the assembly of any of the previous paragraphs, the first cooler includes a pocket that receives the first plate and the second cooler includes a pocket that receives the second plate.

In an example embodiment having one or more features of the assembly of any of the previous paragraphs, the anode flow field of the first end fuel cell includes a plurality of ribs and channels configured to provide reactant for the anode of the first end fuel cell, the electrolyte supply comprises a first plate of the porous material, and the first plate includes at least some of the ribs and channels of the anode flow field of the first end fuel cell.

In an example embodiment having one or more features of the assembly of any of the previous paragraphs, the cathode flow field of the second end fuel cell includes a plurality of ribs and channels configured to provide reactant for the cathode of the second end fuel cell, the electrolyte collector comprises a second plate of the porous material, and the second plate includes at least some of the ribs and channels of the cathode flow field of the second end fuel cell.

In an example embodiment having one or more features of the assembly of any of the previous paragraphs, in an initial assembled condition there is a first amount of electrolyte in the electrolyte supply, there is a second amount of electrolyte in the electrolyte collector, there is a third amount of electrolyte in each matrix, the first amount is greater than the third amount, and the third amount is greater than the second amount.

In an example embodiment having one or more features of the assembly of any of the previous paragraphs, pores of the electrolyte supply porous material have a pore size and distribution configured to allow electrolyte in the supply to move from the electrolyte supply into the anode of the first end fuel cell, and pores of the electrolyte collector porous material have a pore size and distribution configured to allow electrolyte in the cathode of the second end fuel cell to move into the electrolyte collector.

In an example embodiment having one or more features of the assembly of any of the previous paragraphs, the electrolyte supply comprises a first plate of the porous material, the first plate defines at least a portion of the anode flow field of the first end fuel cell, the electrolyte collector comprises a second plate of the porous material, and the second plate defines at least a portion of the cathode flow field of the second end fuel cell.

In an example embodiment having one or more features of the assembly of any of the previous paragraphs, the first plate includes a plurality of ribs and channels that define flow passages of the anode flow field of the first end fuel cell, and the second plate includes a plurality of ribs and channels that define flow passages of the cathode flow field of the second end fuel cell.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention include an electrolyte supply and an electrolyte collector near opposite ends of a stack of fuel cells. The electrolyte supply minimizes or prevents dry out of at least the anode of an adjacent fuel cell near one end of the stack and the electrolyte collector minimizes or prevents flooding of at least a cathode of an adjacent fuel cell near the opposite end of the stack.

Figure 1:
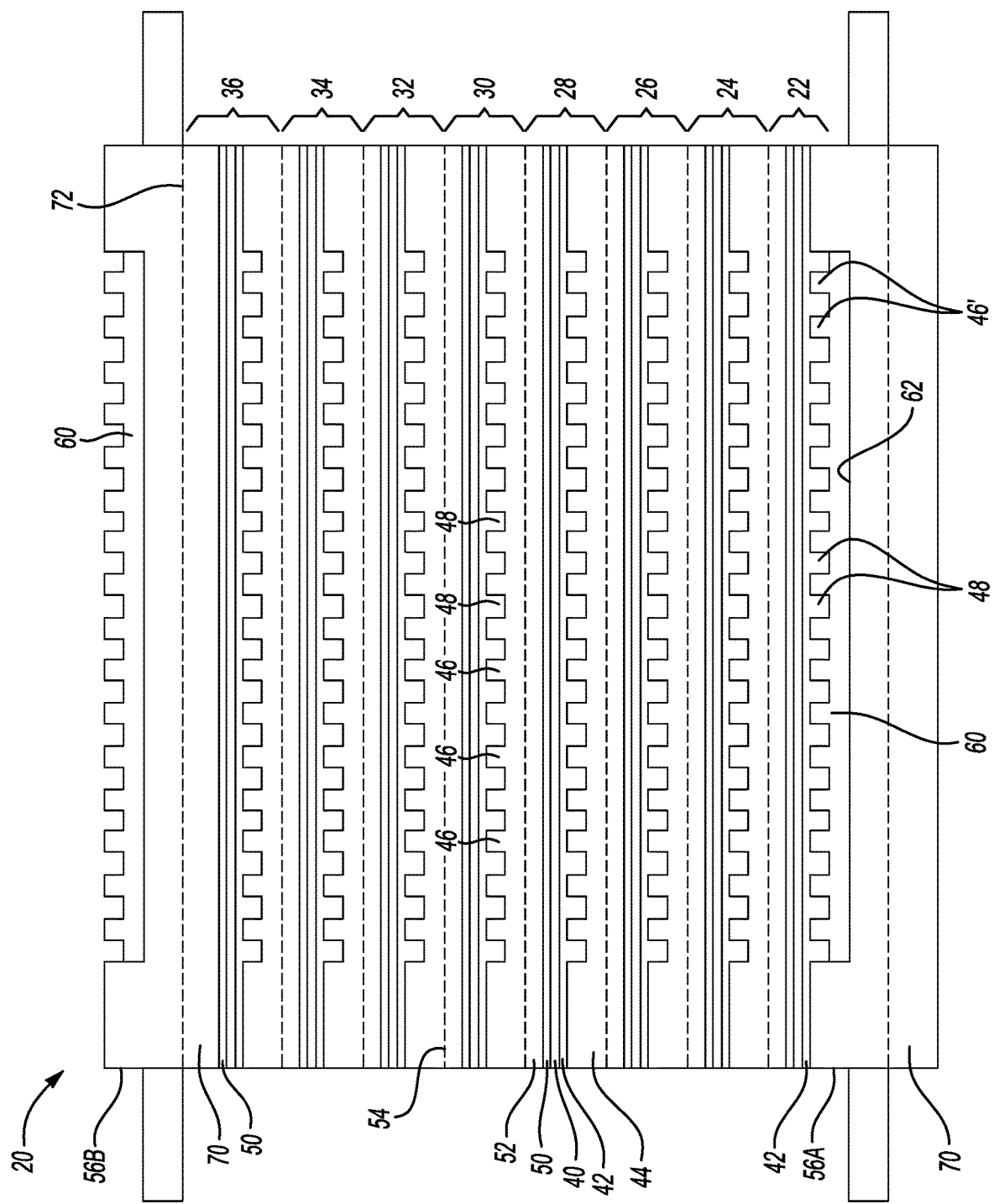
FIG. 1 schematically illustrates selected portions of a fuel cell assembly including an electrolyte supply and an electrolyte collector designed according to an example embodiment.

FIG. 1 schematically illustrates a fuel cell assembly 20. A plurality of fuel cells 22-36 are arranged in a stack. The illustrated stack may be considered a sub-stack that can be included in a power plant that includes multiple sub-stacks in a larger stack. The fuel cell 22 is referred to in this description as a first end fuel cell because it is near one end of the stack. The fuel cell 36 is referred to in this description as a second end fuel cell because it is near a second, opposite end of the stack. In the illustration, the first end corresponds to a bottom of the stack while the second end corresponds to a top of the stack. As those skilled in the art will appreciate, the orientation of the stack of fuel cells 22-36 may differ from that shown in FIG. 1.

Each of the fuel cells includes a matrix 40 containing an electrolyte, such as phosphoric acid. An anode 42 is situated on one side of the matrix 40. An anode flow field 44 adjacent the anode 42 includes a plurality of ribs 46 and channels 48 that establish flow passages for supplying a reactant, such as hydrogen, to the anode 42. The flow passages of the anode flow field 44 are arranged into or out of the page in the illustration.

A cathode 50 is situated on an opposite side of the matrix 40 from the anode 42. A cathode flow field 52 includes flow channels (not illustrated) that supply reactant, such as oxygen, to the cathode 50. In FIG. 1, the flow channels of the cathode flow field 52 are parallel to the page and oriented from one side of the illustrated stack to the other side. Although not specifically shown, the cathode flow field 52 includes a plurality of ribs and channels that are perpendicularly oriented relative to the ribs 46 and channels 48 of the anode flow field 44.

The individual fuel cells are separated as schematically shown by the broken lines 54. In the illustrated embodiment, the anode flow field 44 and cathode flow field 52 of adjacent fuel cells are established by a single, bipolar plate that also serves as the separator 54 between adjacent fuel cells.

One aspect of this invention includes the recognition or discovery of the manner in which the amount of electrolyte in the respective fuel cells changes over time. Conventional thinking has been that since the fuel cells furthest from a cooler tend to be the hottest, those fuel cells loose electrolyte at a higher rate than other fuel cells in a stack, which are closer to a cooler. The assembly 20 shown in FIG. 1 includes a first cooler 56A near the first end of the stack of fuel cells and a second cooler 56B near the second end of the stack. According to conventional understanding, the fuel cells 28, 30 and 32 are expected to experience the highest rate of electrolyte loss during operation of the fuel cell assembly 20 over time.

Figure 2:
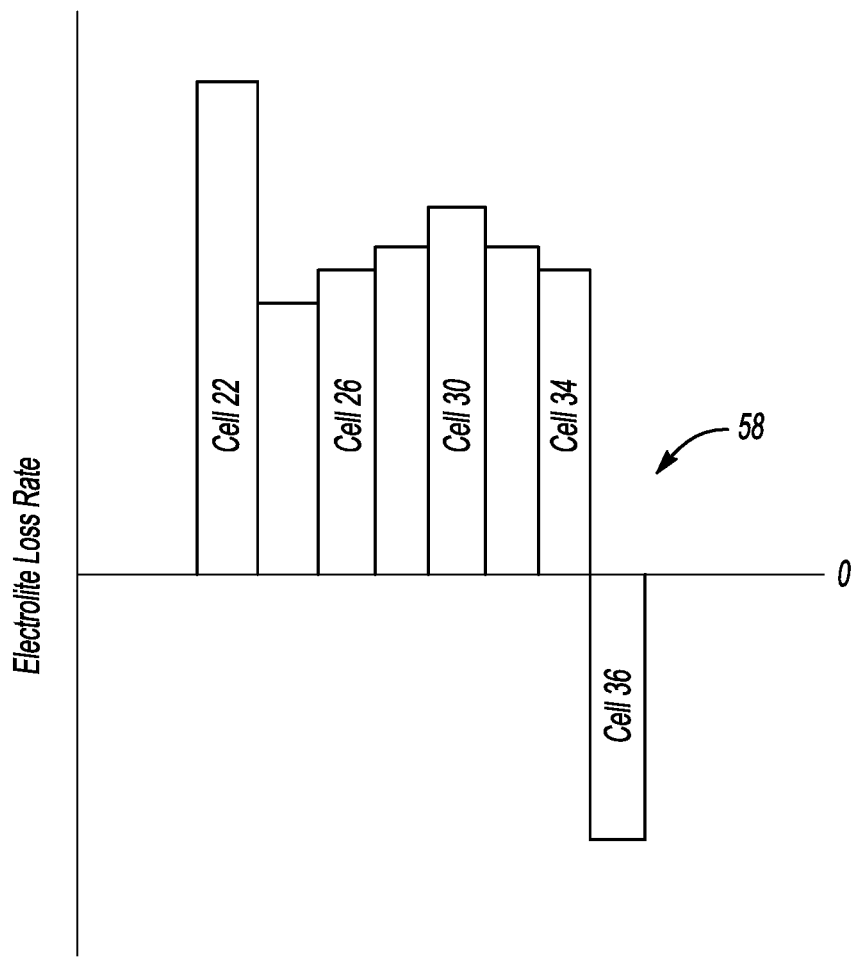
FIG. 2 is a graphical representation of electrolyte changes over time within a fuel cell assembly.

FIG. 2 is a graphical illustration 58 of the actual electrolyte loss rate over time for the cells 22-36. Contrary to conventional understanding, the fuel cell 30 does not have the highest loss rate. Instead, the first end fuel cell 22 experiences a greater electrolyte loss over time relative to all of the rest of the fuel cells 24-36. Additionally, the second end fuel cell 36 does not lose electrolyte over time but instead actually gains electrolyte over time represented by the negative loss shown in FIG. 2.

The actual electrolyte loss rates shown in FIG. 2 lead to the possibility that the first end fuel cell 22 may dry out and the second end fuel cell 36 may become flooded. Either of those conditions is undesirable. One reason for such dry out, flooding or both is the tendency for electrolyte shunt migration to occur between the anode of one fuel cell and the cathode of an adjacent fuel cell caused by the difference in electrical potential. The net effect over time is for the electrodes of the first end fuel cell 22 to tend to dry out and the electrodes of the second end fuel cell 36 to tend to become flooded. The fuel cell assembly 20 shown in FIG. 1 includes an electrolyte supply 60 associated with the anode flow field of the first end fuel cell 22. The electrolyte supply 60 comprises a porous material that contains electrolyte that can be supplied to at least the anode 42 of the first end fuel cell 22. An example porous material comprises phenolic resin and graphite.

In the illustrated example embodiment, the electrolyte supply 60 is received within a pocket 62 formed in one side of the first cooler 56A, which faces toward the anode 42 of the first end fuel cell 22. In this embodiment, the electrolyte supply 60 comprises a porous plate that defines at least some of the ribs 46' and channels 48 of the anode flow field of the first end fuel cell 22. In the illustrated arrangement, the porous plate electrolyte supply 60 defines the entire anode flow field of the first end fuel cell 22.

Including an electrolyte supply 60 near the anode 42 of the first end fuel cell 22 minimizes or eliminates the possibility that the anode 42 of the first end fuel cell 22 will dry out over time. The porous material of the electrolyte supply 60 includes pores having a pore size and distribution that are configured to facilitate electrolyte moving from the electrolyte supply 60 into the anode 42 of the first end fuel cell 22.

The second cooler 56B includes an electrolyte supply 60 for another first end fuel cell (not illustrated). The second cooler 56B also includes an electrolyte collector 70 situated adjacent the cathode 50 of the second end fuel cell 36. The electrolyte collector 70 comprises a porous material that is configured to absorb or receive excess electrolyte from the cathode 50 of the second end fuel cell 36. The electrolyte collector 70 in the illustrated example embodiment comprises a porous plate within the cathode flow field 52 of the second end fuel cell 36. The porous plate of the electrolyte collector 70 defines a plurality of ribs and channels that establish the flow passages of the cathode flow field of the second end fuel cell 36.

The porous material of the electrolyte collector 70 includes pores having a pore size and distribution configured to facilitate movement of electrolyte from the cathode 50 of the second end fuel cell 36 into the electrolyte collector 70 to avoid flooding of the cathode 50 of the second end fuel cell 36.

In an initial condition, the fuel cell assembly 20 includes a first amount of electrolyte in the electrolyte supply 60, a second amount of electrolyte in the electrolyte collector 70 and a third amount of electrolyte in each matrix 40. The first amount of electrolyte in the electrolyte supply 60 in that condition is greater than the third amount within the matrix 40 of the respective fuel cells 22-36. The second amount of electrolyte within the electrolyte collector 70 is less than the third amount included within each matrix 40. In some embodiments, the electrolyte collector 70 is just slightly wetted with electrolyte to avoid the electrolyte collector 70 depleting the electrolyte from the cathode 50 of the second end fuel cell 36 in an undesirable manner.

Each of the coolers includes a barrier 72 that prevents electrolyte migration beyond the electrolyte collector 70 toward an adjacent set or sub-stack of fuel cells (not illustrated).

Including an electrolyte supply 60 and an electrolyte collector 70 near opposite ends of a stack of fuel cells facilitates managing the amount of electrolyte of the respective fuel cells to prevent drying out or flooding of the fuel cells, which extends the operational life and enhances the overall performance of a fuel cell assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell assembly, comprising:
a plurality of fuel cells arranged in a stack including a first end fuel cell near a first end of the stack and a second end fuel cell near a second end of the stack,
wherein each of the fuel cells includes a matrix containing an electrolyte, an anode on one side of the matrix, an anode flow field adjacent the anode, a cathode on another side of the matrix, and a cathode flow field adjacent the cathode;
an electrolyte supply associated with the anode flow field of the first end fuel cell, the electrolyte supply comprising a porous material containing electrolyte, the electrolyte supply being configured to provide electrolyte to at least the anode of the first end fuel cell; and
an electrolyte collector associated with the cathode flow field of the second end fuel cell, the electrolyte collector comprising a porous material configured to collect electrolyte from at least the cathode of the second end fuel cell,
wherein in an initial assembled condition:
there is a first amount of electrolyte in the electrolyte supply,
there is a second amount of electrolyte in the electrolyte collector,
there is a third amount of electrolyte in each matrix, the first amount is greater than the third amount, and the third amount is greater than the second amount.

2. The assembly of claim 1, comprising
a first cooler adjacent the first end fuel cell; and
a second cooler adjacent the second end fuel cell,
wherein the first cooler includes the anode flow field of the first end fuel cell and the electrolyte supply, and
wherein the second cooler includes the cathode flow field of the second end fuel cell and the electrolyte collector.

3. The assembly of claim 2, wherein
the electrolyte supply comprises a first plate of the porous material;
the first plate is supported on a side of the first cooler facing the anode of the first end fuel cell;
the electrolyte collector comprises a second plate of the porous material; and
the second plate is supported on a side of the second cooler facing the cathode of the second end fuel cell.

4. The assembly of claim 3, wherein
the first cooler includes a pocket that receives the first plate; and
the second cooler includes a pocket that receives the second plate.

5. The assembly of claim 1, wherein
the anode flow field of the first end fuel cell includes a plurality of ribs and channels configured to provide reactant for the anode of the first end fuel cell;
the electrolyte supply comprises a first plate of the porous material; and
the first plate includes at least some of the ribs and channels of the anode flow field of the first end fuel cell.

6. The assembly of claim 5, wherein
the cathode flow field of the second end fuel cell includes a plurality of ribs and channels configured to provide reactant for the cathode of the second end fuel cell;
the electrolyte collector comprises a second plate of the porous material; and
the second plate includes at least some of the ribs and channels of the cathode flow field of the second end fuel cell.

7. The assembly of claim 1, wherein
pores of the electrolyte supply porous material have a pore size and distribution configured to allow electrolyte in the supply to move from the electrolyte supply into the anode of the first end fuel cell; and
pores of the electrolyte collector porous material have a pore size and distribution configured to allow electrolyte in the cathode of the second end fuel cell to move into the electrolyte collector.

8. The assembly of claim 1, wherein
the electrolyte supply comprises a first plate of the porous material;
the first plate defines at least a portion of the anode flow field of the first end fuel cell;
the electrolyte collector comprises a second plate of the porous material; and
the second plate defines at least a portion of the cathode flow field of the second end fuel cell.

9. The assembly of claim 8, wherein
the first plate includes a plurality of ribs and channels that define flow passages of the anode flow field of the first end fuel cell; and
the second plate includes a plurality of ribs and channels that define flow passages of the cathode flow field of the second end fuel cell.

10. The assembly of claim 1, wherein
the electrolyte in the electrolyte supply prevents dry-out of the anode flow field of the first end fuel cell, and
the electrolyte collector prevents flooding of the cathode of the second end fuel cell.

11. A method of assembling a fuel cell stack assembly, the method comprising:
arranging a plurality of fuel cells in a stack including a first end fuel cell near a first end of the stack and a second end fuel cell near a second end of the stack, each of the fuel cells including a matrix containing an electrolyte, an anode on one side of the matrix, an anode flow field adjacent the anode, a cathode on another side of the matrix, and a cathode flow field adjacent the cathode;
associating an electrolyte supply with the anode flow field of the first end fuel cell, the electrolyte supply comprising a porous material containing electrolyte, the electrolyte supply being configured to provide electrolyte to at least the anode of the first end fuel cell;
associating an electrolyte collector with the cathode flow field of the second end fuel cell, the electrolyte collector comprising a porous material configured to collect electrolyte from at least the cathode of the second end fuel cell;
placing a first amount of electrolyte in the electrolyte supply;
placing a second amount of electrolyte in the electrolyte collector; and
placing a third amount of electrolyte in each matrix, wherein
the first amount is greater than the third amount and the third amount is greater than the second amount.

12. The method of claim 11, wherein
the electrolyte in the electrolyte supply prevents dry-out of the anode flow field of the first end fuel cell, and the electrolyte collector prevents flooding of the cathode of the second end fuel cell.

\* \* \* \* \*